United States Patent
Miyazaki et al.

(10) Patent No.: US 12,506,415 B2
(45) Date of Patent: Dec. 23, 2025

(54) POWER CONVERSION DEVICE

(71) Applicant: HITACHI ASTEMO, LTD., Hitachinaka (JP)

(72) Inventors: Hideki Miyazaki, Hitachinaka (JP); Takashi Okamoto, Hitachinaka (JP); Toshiyuki Innami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/845,472

(22) PCT Filed: Mar. 11, 2022

(86) PCT No.: PCT/JP2022/011130
§ 371 (c)(1),
(2) Date: Sep. 10, 2024

(87) PCT Pub. No.: WO2023/170978
PCT Pub. Date: Sep. 14, 2023

(65) Prior Publication Data
US 2025/0202374 A1 Jun. 19, 2025

(51) Int. Cl.
*H02M 3/335* (2006.01)
*H02J 1/08* (2006.01)
(Continued)

(52) U.S. Cl.
CPC ......... *H02M 3/33584* (2013.01); *H02J 1/082* (2020.01); *H02J 1/102* (2013.01);
(Continued)

(58) Field of Classification Search
CPC .... H02M 3/33584; H02M 1/008; H02M 3/01; H02M 3/33573; H02J 1/082; H02J 1/102
See application file for complete search history.

(56) References Cited

U.S. PATENT DOCUMENTS 9,531,247 B2 * 12/2016 Kuznetsov ............. H02K 7/025
9,831,768 B2 * 11/2017 Lam ....................... H02M 3/158
(Continued)

FOREIGN PATENT DOCUMENTS

JP 2005-312284 A 11/2005
JP 2006-141149 A 6/2006
(Continued)

OTHER PUBLICATIONS

International Search Report with English Translation in corresponding International Application No. PCT/JP2022/011130, dated May 10, 2022.
(Continued)

*Primary Examiner* — Rexford N Barnie
*Assistant Examiner* — Esayas G Yeshaw
(74) *Attorney, Agent, or Firm* — Foley & Lardner LLP

(57) ABSTRACT

A power conversion device includes: a DC/DC converter; and a control circuit unit that controls the DC/DC converter, in which the DC/DC converter includes a first power output circuit that converts first direct current power into first alternating current power, an isolation transformer that converts the first alternating current power into second alternating current power, and one or a plurality of second power output circuits, each of which converts the second alternating current power into second direct current power, and the control circuit unit includes a resonance characteristic calculator that calculates a resonance characteristic of the second power output circuits based on a load for each of the second power output circuits to output the second direct current power, and determines a drive frequency of the first power output circuit based on an output request value of the second power output circuit and the resonance characteristic that is calculated.

5 Claims, 8 Drawing Sheets

(51) Int. Cl.
*H02J 1/10* (2006.01)
*H02M 1/00* (2006.01)
*H02M 3/00* (2006.01)

(52) U.S. Cl.
CPC .............. *H02M 1/008* (2021.05); *H02M 3/01* (2021.05); *H02M 3/33573* (2021.05)

(56) References Cited

U.S. PATENT DOCUMENTS

| | | | | |
|---|---|---|---|---|
| 12,149,178 | B2* | 11/2024 | Drofenik | ................ H02M 3/01 |
| 2006/0152174 | A1* | 7/2006 | Ushijima | ............ H05B 41/282 |
| | | | | 315/307 |
| 2016/0336928 | A1* | 11/2016 | Kuznetsov | ................ H02J 3/30 |
| 2017/0279310 | A1 | 9/2017 | Ii et al. | |
| 2019/0341781 | A1* | 11/2019 | Marchegiani | ............. H02J 3/46 |
| 2020/0212815 | A1* | 7/2020 | Yamasaki | ............. H02J 7/0013 |
| 2023/0022784 | A1 | 1/2023 | Suzuki et al. | |

FOREIGN PATENT DOCUMENTS

| | | |
|---|---|---|
| JP | 2006-254613 A | 9/2006 |
| JP | 2016-158353 A | 9/2016 |
| JP | 2017-175718 A | 9/2017 |
| JP | 2020-108236 A | 7/2020 |
| JP | 2021-164257 A | 10/2021 |

OTHER PUBLICATIONS

Japanese Office Action issued in corresponding JP Application No. 2024-505859, dated Oct. 14, 2025 with English translation (11 pages).

* cited by examiner

FIG. 6
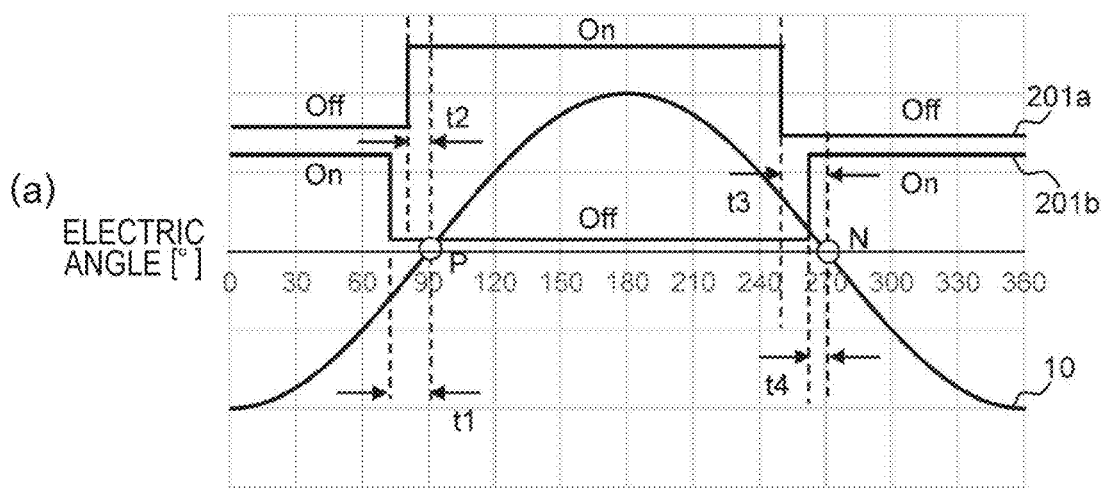
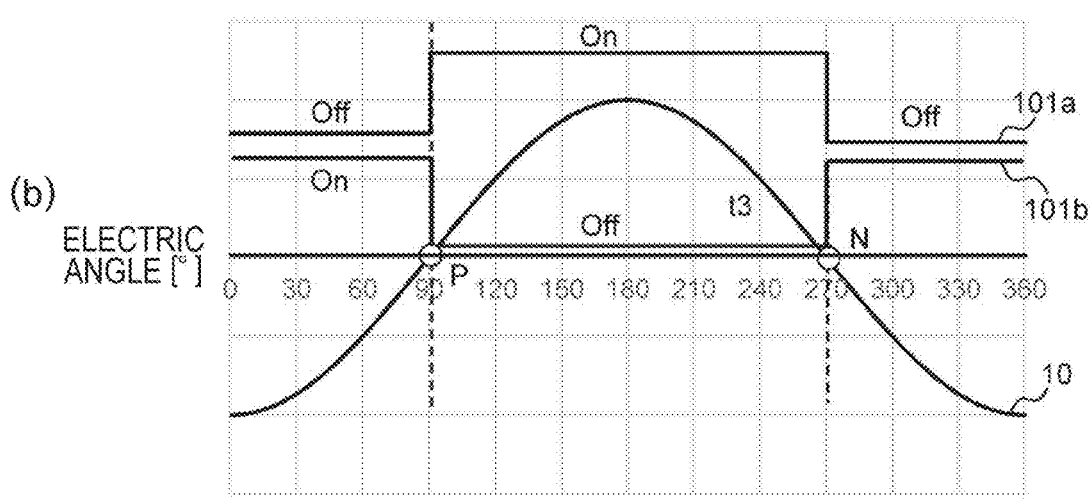

POWER CONVERSION DEVICE

TECHNICAL FIELD

The present invention relates to a power conversion device.

BACKGROUND ART

A bi-directional charging/feeding device mounted on an electric vehicle such as a battery electric vehicle (BEV) can charge electric power to the vehicle from the outside of the vehicle, and conversely, can feed electric power to the outside of the vehicle from the vehicle. A bi-directional power source (bi-directional on board charger (Bi-directional OBC)) included in such a bi-directional charging/feeding device, a DC/DC converter, and an in-vehicle AC power source need to be electrically insulated from one another, and an isolation transformer is used.

However, when a plurality of isolation transformers are used to electrically insulate each of them, there is a problem of cost increase. To solve this problem, there is a demand for a bi-directional charging/feeding device that can supply proper power to a plurality of power sources while satisfying conditions of inexpensive price and downsizing by sharing one isolation transformer.

As a background art of the invention of the present application, PTL 1 below discloses a power conversion device in which a main DC/DC converter and a sub DC/DC converter are connected to one isolation transformer in order to properly supply a plurality of electric powers having different voltages.

CITATION LIST

Patent Literature

PTL 1: JP 2020-108236 A

SUMMARY OF INVENTION

Technical Problem

In the power conversion device of Patent Literature 1, a resonance converter assuming control in a state where load power is stable is used as a main DC/DC converter. In general, the resonance converter determines a resonance characteristic in advance and controls an output by changing a drive frequency and a phase in an operation region where the resonance characteristic does not depend on a load in accordance with the resonance characteristic. However, in the bi-directional charging/feeding device mounted on the electric vehicle, the output changes manyfold depending on the device connected to the in-vehicle AC power source, and therefore the load greatly changes, and the resonance characteristic also changes accordingly. In such a state, a proper output cannot be obtained by the frequency control in accordance with a predetermined resonance characteristic, and the efficiency of power conversion also decreases. The conventional power conversion devices have such a problem.

In view of this, an object of the present invention is to provide a power conversion device that achieves high efficiency while ensuring proper power supply to a plurality of power sources.

Solution to Problem

A power conversion device includes: a DC/DC converter; and a control circuit unit that controls the DC/DC converter, in which the DC/DC converter includes a first power output circuit that converts first direct current power into first alternating current power, an isolation transformer that converts the first alternating current power into second alternating current power, and one or a plurality of second power output circuits, each of which converts the second alternating current power into second direct current power, and the control circuit unit includes a resonance characteristic calculator that calculates a resonance characteristic of the second power output circuits based on a load for each of the second power output circuits to output the second direct current power, and determines a drive frequency of the first power output circuit based on an output request value of the second power output circuit and the resonance characteristic that is calculated.

Advantageous Effects of Invention

It is possible to provide a power conversion device that achieves high efficiency while ensuring proper power supply to a plurality of power sources.

BRIEF DESCRIPTION OF DRAWINGS

FIG. 6 is an explanatory diagram of gate pulse timing of a DC/AC converter of a primary side switching circuit and an AC/DC converter of a secondary side switching circuit.

Figure 1:
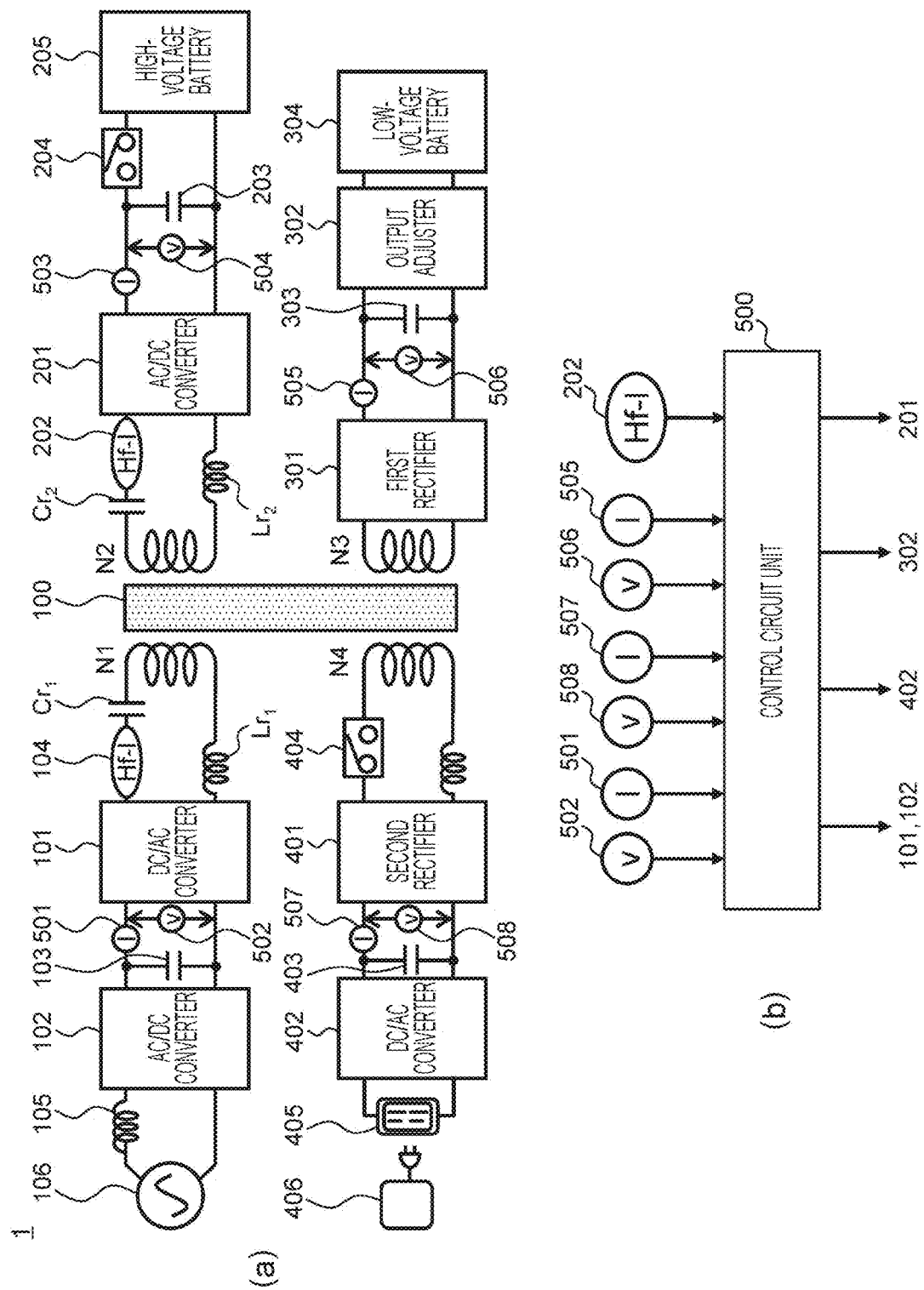
FIG. 1 is an explanatory diagram of a power conversion device according to one embodiment of the present invention.

Hereinafter, an embodiment of the present invention will be described with reference to the drawings. The following description and drawings are examples for explaining the present invention, and are omitted and simplified as appropriate for the sake of clarity of description. The present invention can be carried out in various other forms. Unless otherwise specified, each constituent element may be singular or plural.

The positions, sizes, shapes, ranges, and the like of the constituent elements illustrated in the drawings do not always represent actual positions, sizes, shapes, ranges, and the like, for the sake of easy understanding of the invention. Therefore, the present invention is not necessarily limited to the position, size, shape, range, and the like disclosed in the drawings.

(Configuration of Power Conversion Device According to One Embodiment of Present Invention)

(FIG. 1)

FIG. 1(a) is an overall configuration diagram of a power conversion device 1, and FIG. 1(b) is a view illustrating input/output to a control circuit unit that controls the power conversion device 1. The power conversion device 1 has two switching circuits, one of which serves as input and the other of which serves as output by switching of the operation mode (charging mode and discharging mode), and thus the power conversion device 1 has a role of a bi-directional charger. For example, in a vehicle such as an electric automobile, receiving electric power from a commercial (household) alternating current power source 106 and charging a high-voltage battery 205 mounted on the vehicle has a role of a charger for obtaining drive power of the vehicle. With the vehicle as a household storage battery, the power conversion device 1 transmits the power stored in the vehicle from the in-vehicle high-voltage battery 205, and supplies the power also to an alternating current load 406 different from a low-voltage battery 304 and the commercial alternating current power source 106 mounted on the same vehicle. To achieve such an operation of the bi-directional charger, the power conversion device 1 includes an insulated DC/DC converter in which an input side and an output side are electrically insulated. Due to this, by performing voltage conversion and step-down, the power conversion device 1 has a role of a multi-output power source device as in the example of four power supplies in FIG. 1.

The power conversion device 1 used in the present invention is configured using a resonant converter. The resonant converter is mainly used in a power source device having a large capacity, and achieves high efficiency, downsizing, and low noise by using resonance of leakage inductance (L), excitation inductance (L), and capacitor (C) of a transformer (decreasing a coupling coefficient to increase leakage inductance). The resonant converter generates a rectangular wave voltage with a duty ratio close to 50%, and generates a current waveform close to a sinusoidal wave by an LLC resonance circuit, thereby suppressing generation of harmonics.

The power conversion device 1 is provided with one isolation transformer 100 of multi winding, and adopts a connection form in which this isolation transformer 100 is shared by a plurality of circuits. The structure of the DC/DC converter included in the power conversion device 1 is a configuration including a first power output circuit that plays a role of a power transmission side by converting first direct current power into first alternating current power, the isolation transformer 100 that converts first alternating current power into second alternating current power, and one or a plurality of second power output circuits, each of plays a role of a power reception side by converting second alternating current power into second direct current power.

The isolation transformer 100 includes a primary winding and a secondary winding that are wound around an iron core, a ferrite core, or the like, and when a current change occurs in a primary winding N1, an electromotive force (back electromotive force) in an orientation opposite to a current direction is generated so as to prevent the current change. A secondary winding N2 also has a structure in which an electromotive force (induced electromotive force) is generated by a magnetic flux change through the core, and an induced current flows. The front and rear of the isolation transformer 100 are rectified by a capacitor Cr1, a capacitor Cr2, a first rectifier 301, and a second rectifier 401.

The first power output circuit having a role of the power transmission side in the power conversion device 1 includes a primary side switching circuit connected between an AC/DC converter 102 and the isolation transformer 100, or a secondary side switching circuit connected between the high-voltage battery 205, which is a first direct current battery, and the isolation transformer 100. Note that when the primary side switching circuit is the first power output circuit on the power transmission side, the secondary side switching circuit is the second power output circuit on the power reception side. Conversely, when the secondary side switching circuit is the first power output circuit on the power transmission side, the primary side switching circuit is the second power output circuit on the power reception side.

The second power output circuit having the role of the power reception side in the power conversion device 1 includes either the primary side switching circuit or the secondary side switching circuit having the role of the power reception side in the first power output circuit. A tertiary side circuit connected between the second direct current battery 304 lower in voltage than the first direct current battery 205 and the isolation transformer 100, and a quaternary side circuit connected between the DC/AC converter 402 and the isolation transformer 100 are included.

Either the primary side switching circuit or the secondary side switching circuit is the first power output circuit because the power conversion device 1 is a bi-directional OBC as described above. For example, in a case of charging to a vehicle (high-voltage battery 205) from a household power source (commercial alternating current power source 106), the primary side switching circuit functions as the first power output circuit. Conversely, in a case of power feed to the household power source (commercial alternating current power source 106) from the vehicle (high-voltage battery 205), the secondary side switching circuit functions as the first power output circuit.

In the isolation transformer 100, the primary side winding N1 of the transformer connected to the primary side switching circuit, the secondary side winding N2 of the transformer connected to the secondary side switching circuit, a tertiary side winding N3 of the transformer connected to the tertiary side circuit, and a quaternary side winding N4 of the transformer connected to the quaternary side circuit are disposed away from one another around one shared transformer core. Due to this, the alternating current power source 106, the high-voltage battery 205, the low-voltage battery 304, and the alternating current load 406 are insulated from one another.

The first power output circuit and the second power output circuit each including the primary side switching circuit or the secondary side switching circuit in the power conversion device 1 will be described. Note that in the following description, a process of power supply from the commercial alternating current power source 106 to the side of the battery 205 mounted on the vehicle in the power conversion device 1 will be described as an example. In this case, as described above, the primary side switching circuit is the first power output circuit, and the secondary side switching circuit is the second power output circuit.

The AC/DC converter 102 is connected to the commercial alternating current power source 106 via a smoothing choke coil 105. The AC/DC converter 102 rectifies the commercial alternating current power received from the commercial alternating current power source 106, converts and outputs, as direct current power, the rectified commercial alternating current power into a required direct current voltage level. The AC/DC converter 102 is connected to a DC/AC converter 101 of the primary side switching circuit functioning as the first power output circuit, and a smoothing capacitor 103 for voltage smoothing, a current detector 501 that detects a current of direct current, and a voltage detector 502 that detects a voltage of direct current are provided therebetween.

The DC/AC converter 101 has a circuit configuration of an H bridge (single phase full bridge), which can bi-directionally convert the power. The DC/AC converter 101 has a function of obtaining supply of a direct current voltage smoothed via the capacitor 103 from the AC/DC converter 102 and outputting an alternating current voltage having a rectangular wave. The primary side winding N1 of the transformer 100 is connected between the two output terminals of the DC/AC converter 101 via the resonance capacitor Cr1 and the resonance inductance Lr1. In this manner, an LLC circuit is formed by the primary side winding N1 of the transformer 100, the resonance capacitor Cr1, and the resonance inductance Lr1, thereby improving the efficiency of voltage conversion. A radio frequency current detector 104 is provided between the DC/AC converter 101 and the resonance capacitor Cr1.

In the secondary side switching circuit functioning as the second power output circuit, an output terminal of the AC/DC converter 201 having an H bridge configuration is connected to the secondary side winding N2 of the transformer via the resonance capacitor Cr2 and a resonance inductance Lr2. A detector 202 of radio frequency current is provided between the AC/DC converter 201 and the resonance capacitor Cr2. A direct current terminal of the AC/DC converter 201 is provided with a current detector 503 that detects a current of direct current, a detector 504 that detects a voltage of direct current, and a smoothing capacitor 203. The direct current power output from the AC/DC converter 201 via the smoothing capacitor 203 is supplied to the high-voltage battery 205 by switching on/off of a relay 204.

Subsequently, the tertiary side circuit and the quaternary side circuit each included in the second power output circuit will be described. Note that in the following description, a process in which power is supplied from the high-voltage battery 205 of the vehicle to the low-voltage battery 304 and the alternating current load 406 in the power conversion device 1 will be described as an example. In this case, the secondary side switching circuit is the first power output circuit, and the tertiary side and quaternary side circuits are the second power output circuit. Note that only one of the tertiary side circuit and the quaternary side circuit may be used as the second power output circuit.

In the tertiary side circuit functioning as the second power output circuit, the alternating current voltage supplied from the high-voltage battery 205 via the secondary side switching circuit and induced by the tertiary side winding N3 of the transformer via the isolation transformer 100 is rectified or subjected to voltage doubler rectifier by the first rectifier 301. The voltage rectified by the first rectifier 301 is smoothed by a capacitor 303 and supplied to the positive and negative terminals of the low-voltage battery 304 via an output adjuster 302. A current detector 505 that detects a current of direct current and a detector 506 that detects a voltage of direct current are provided between the first rectifier 301 and the output adjuster 302.

On the other hand, in the quaternary side circuit functioning as the second power output circuit, the alternating current voltage supplied from the high-voltage battery 205 via the secondary side switching circuit and induced by the quaternary side winding N4 of the transformer via the isolation transformer 100 is input to the second rectifier 401, and rectified or subjected to voltage doubler rectifier. The voltage rectified by the second rectifier 401 is smoothed by the capacitor 403 and converted into an alternating current voltage having a predetermined voltage amplitude by the DC/AC converter 402. A current detector 507 that detects a current of direct current output from the second rectifier 401 and a detector 508 that detects a voltage of direct current are provided between the second rectifier 401 and the DC/AC converter 402. The DC/AC converter 402 outputs alternating current power to the alternating current load 406 via an in-vehicle power socket 405.

Note that when the primary side switching circuit functions as the second power output circuit on the power reception side, the AC/DC converter 102 outputs alternating current power having a first voltage effective value (e.g., 200 V) based on direct current power output from the DC/AC converter 101 of the primary side switching circuit. On the other hand, the DC/AC converter 402 outputs alternating current power having a second voltage effective value (e.g., 100 V) different from the first voltage effective value to the alternating current load 406 based on the direct current power output from the second rectifier 401 of the quaternary side circuit. In this manner, the primary side switching circuit is assumed to be twice or more larger in rated output power than the quaternary side circuit.

In the power conversion device 1, a control circuit unit 500 controls the AC/DC converter 102, the DC/AC converter 402, and the DC/DC converter. In the control of the DC/DC converter, the DC/AC converter 101 of the primary side switching circuit, the AC/DC converter 201 of the secondary side switching circuit, and the output adjuster 302 of the tertiary side switching circuit are controlled.

When the secondary side switching circuit is a power supply side, the control circuit unit 500 can monitor the power to be supplied and a load state on a demand side by grasping signals detected by the current detector 501 and the voltage detector 502 in the primary side switching circuit, signals detected by the current detector 505 and the voltage detector 506 in the tertiary side circuit, and signals detected by the current detector 507 and the voltage detector 508 in the quaternary side circuit, which are all on the power demand side. Based on these monitoring results, the control circuit unit 500 controls the operation of the AC/DC converter 201 of the secondary side switching circuit.

In this case, the control circuit unit 500 generates and outputs, to the AC/DC converter 102 and the DC/AC converter 101, gate signals based on the current value and the voltage value detected by the current detector 501 and the voltage detector 502, respectively. The control circuit unit 500 outputs, to the DC/AC converter 402, gate signals based on the current and the voltage detected by the current detector 507 and the voltage detector 508, respectively, and generates and outputs, to the output adjuster 302, control signals based on the current and the voltage detected by the current detector 505 and the voltage detector 506 respectively. Furthermore, the control circuit unit 500 generates and outputs, to the AC/DC converter 102, a gate signal based on the current value detected by the detector 202 of radio frequency current in order to monitor the control current on the power transmission side.

Figure 2:
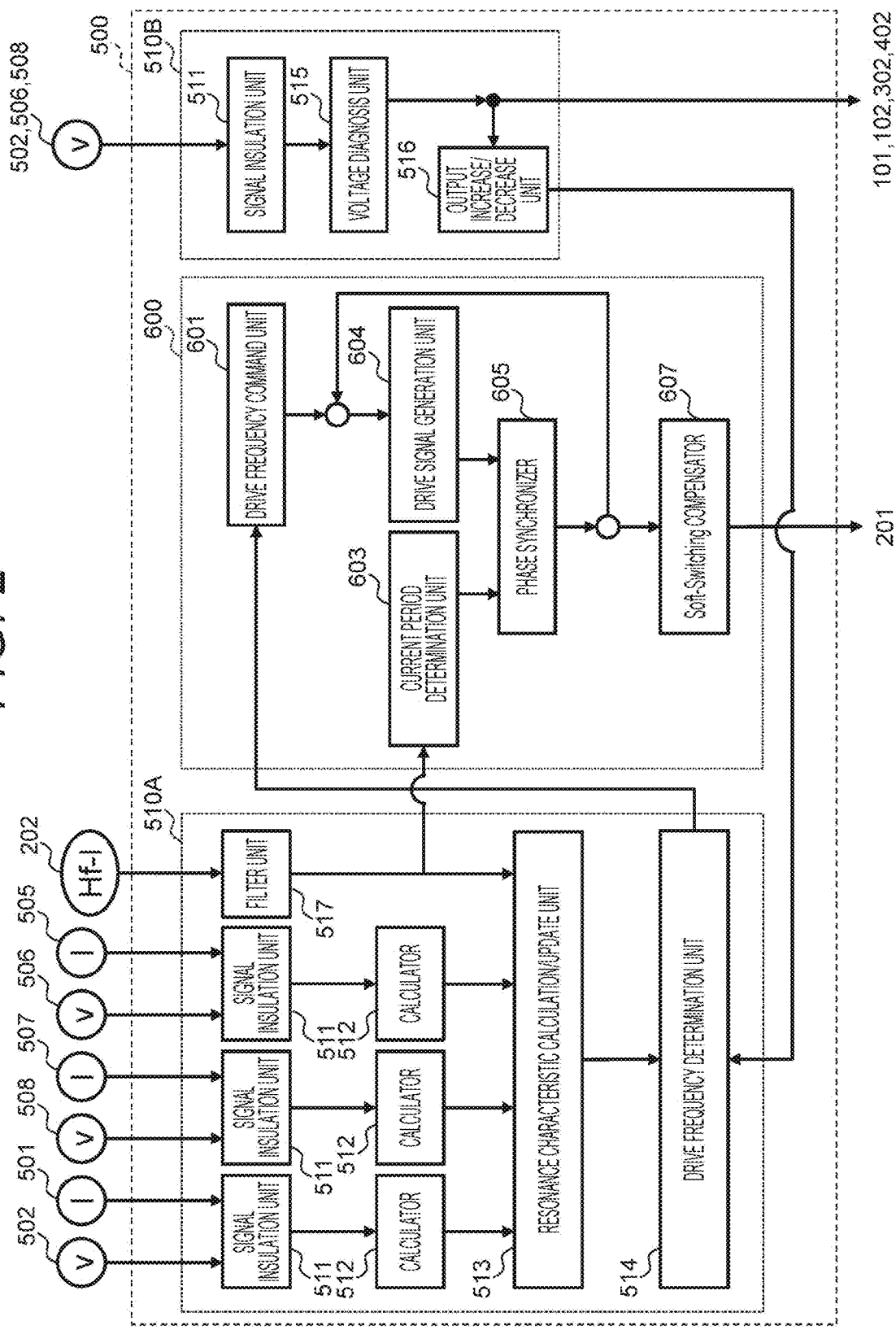
FIG. 2 is a circuit diagram of a controller according to one embodiment of the present invention.

On the other hand, when the primary side switching circuit is the power supply side, the control circuit unit 500 can monitor the power to be supplied and the load state on the demand side by grasping the signals detected by the current detector 503 and the voltage detector 504 in the secondary side switching circuit, which is the power demand side. Based on these monitoring results, the control circuit unit 500 controls the operation of the DC/AC converter 101 of the primary side switching circuit.
(FIG. 2)

The control circuit unit 500 includes a calculation update unit 510A, a radio frequency driver 600, and a diagnosis unit 510B. In a case where the secondary side switching circuit is the power supply side, the signals detected by the current detector 501 and the voltage detector 502, the signals detected by the current detector 505 and the voltage detector 506, and the signals detected by the current detector 507 and the voltage detector 508 are each input to the control circuit unit 500 and processed by the calculation update unit 510A. Note that in the following description, the operation of the control circuit unit 500 in the case where the secondary side switching circuit is the power supply side will be described as an example, but the same applies to a case where the primary side switching circuit is the power supply side except that the load that is a calculation target is different.

In the calculation update unit 510A, the input signals are each subjected to signal isolation by a signal isolation unit 511 for separating the input signals from a reference potential of the original detection portion. Subsequently, the calculator 512 calculates, in a regression analysis manner, a load resistance value based on the sampling value of the detection signal that is subjected to the signal isolation. This load resistance value is a load resistance value of the load of the commercial alternating current power source 106, the load of the low-voltage battery 304, and the load 406 connected to the in-vehicle AC power socket 405 having a role of an outlet. In this manner, in order to change the resonance characteristic, the voltage and the current on an outlet side are input to the calculation update unit 510A for each of the primary side switching circuit, the tertiary side circuit, and the quaternary side circuit, and the calculator 512 analyzes the sampling values that are grasped.

A resonance characteristic calculation/update unit 513 calculates a total impedance (combined impedance) of the circuit from the resistance value of each load obtained by the calculator 512 and the excitation inductance of the resonance capacitor Cr2, the resonance inductance Lr2, and the isolation transformer 100 detected by the detector 202. Due to this, the characteristics such as the resonance point frequency and the total admittance can be obtained from the calculated total impedance and the values of a resonance coil and a capacitor, and the drive frequency necessary for a drive frequency determination unit 514 described later can be calculated. Then, the excitation frequency of the isolation transformer 100 is changed from the calculated frequency to adjust the sum of power, and drive control with optimized resonance characteristics can be performed on this adjusted sum of power.

In general, in the resonance power converter, output increases as the drive frequency approaches the resonance point. At this time, the resonance characteristic changes in accordance with loads of the primary side switching circuit, the tertiary side circuit, and the quaternary side circuit.

Conventionally, regarding the resonance characteristic represented by admittance corresponding to output with respect to the frequency, the gain of the resonance point changes with the load, but at a frequency higher than the resonance point, an influence of the load is considered to be small with respect to a drooping characteristic used for control, and therefore, when output control is performed in this region, it is often adjusted by a phase without changing the frequency. However, when the change in the load state becomes large due to an addition of a resistor for the circuit connected as a load, the resonance frequency changes due to the excitation inductance of the isolation transformer 100 and the combined impedance of the load, and therefore a proper output cannot be obtained by the frequency control in accordance with the initially determined characteristic as ever.

Therefore, the present invention is configured to properly output the drive frequency for operating the switching circuit by detecting the load state, updating the resonance characteristic in accordance with each load, changing the drive frequency based on the resonance characteristic, controlling the output, and adjusting the drive frequency. In order to achieve this configuration, it is necessary to grasp the load state of each circuit added to the isolation transformer 100.

The drive frequency determination unit 514 determines the drive frequency with the resonance point frequency calculated by the resonance characteristic calculation/update unit 513 and the total admittance as basic characteristics. Determination of the drive frequency is adjusted by an output increase/decrease unit 516 included in the diagnosis unit 510B described later. This updates the pulse timing of the switching circuit on the power transmission side (first power output circuit) of the power conversion device 1. The determined drive frequency is input to a drive frequency command unit 601 of the radio frequency driver 600.

The radio frequency driver 600 will be described. The drive frequency command unit 601 outputs a command value to a drive signal generation unit 604, whereby the drive signal generation unit 604 generates a drive signal for the switching circuit. A current period determination unit 603 determines the phase of a radio frequency sinusoidal wave current by receiving the signal of the detector 202 of radio frequency current via a filter and input to the calculation update unit 510A. A phase synchronizer 605 compares the phase of the radio frequency sinusoidal wave current determined by the current period determination unit 603 with the drive signal generated by the drive signal generation unit 604. The comparison result is fed back to the command value to be output from the drive frequency command unit 601 to the drive signal generation unit 604. Due to this, the work of aligning the phases is repeated to generate a gate signal synchronized with the current.

A Soft-Switching compensator 607 outputs the gate signal successfully synchronized with the current by the phase synchronizer 605 to the AC/DC converter 201, which is a switching circuit on the power transmission side, and turns on/off the radio frequency sinusoidal wave current under a condition of equal to or less than a predetermined threshold. Soft-Switching is a device driving method used to suppress an increase in proportion to the frequency in switching loss when the device of the H bridge circuit is switched in a case of a radio frequency exceeding 100 kHz, for example. The phase synchronizer 605 performs phase synchronization (on/off phase estimation of the device in consideration of delay with reference to the gate signal and aligning of the phase of the radio frequency sinusoidal wave current) of the gate signal with reference mainly to the current waveform so as to instruct on/off in a phase close to zero current of the radio frequency sinusoidal wave current, and the Soft-Switching compensator 607 compensates for a phase for turning on/off the device of the H bridge circuit.

The diagnosis unit 510B will be described below. The signal detected by each of the voltage detectors 502, 506, and 508 is input to the signal isolation unit 511 of the diagnosis unit 510B to be converted into a variable handled by control. Based on the converted variable, a voltage diagnosis unit 515 compares the loads (the alternating current power source 106, the low-voltage battery 304, and the alternating current load 406) corresponding to the respective detection signals with the voltage. In a case where the voltage is low with respect to the load as a result of the comparison, the voltage diagnosis unit 515 determines shortage of the load current and issues an instruction to increase the current to the drive frequency command unit 601 of the radio frequency driver 600 via the output increase/decrease unit 516. Based on the output of the voltage diagnosis unit 515, drive signals to the AC/DC converter 102, the DC/AC converter 101, the output adjuster 302, and the DC/AC converter 402 are output in the form of PWM drive.

In this manner, the control circuit unit 500 calculates the resonance characteristic of the second power output circuit based on a load for each of one or a plurality of the second power output circuits to output the second direct current power, and determines the drive frequency of the first power output circuit based on the output request value of the second power output circuit and the calculated resonance characteristic.

(FIG. 3)

Figure 3:
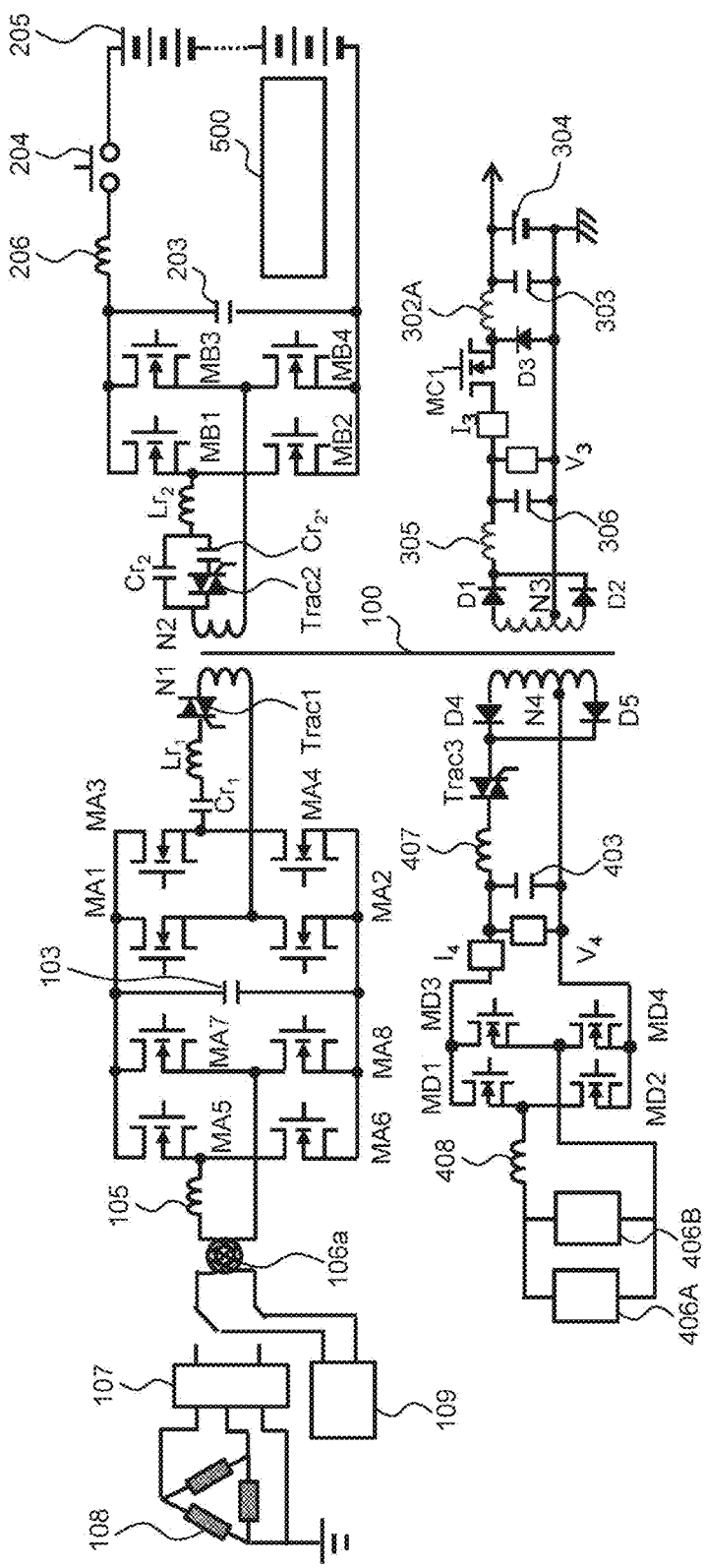
FIG. 3 is an electric circuit diagram of a power conversion device according to one embodiment of the present invention.

FIG. 3 is an example of an electric circuit diagram of the power conversion device 1 illustrated in FIG. 1. Note that since the secondary side switching circuit is used as the first power output circuit that is the power transmission side, the control circuit unit 500 is illustrated as a configuration to be installed in the secondary side switching circuit, but when the primary side switching circuit is the first power output circuit, the control circuit unit 500 may be installed in the primary side switching circuit.

The correspondence between each switching circuit and each converter illustrated in FIG. 1 will be described. Switching circuits MA1 to MA4 are power MOSFETs constituting an H bridge having the same function as that of the DC/AC converter 101. Switching circuits MA5 to MA8 are power MOSFETs constituting an H bridge having the same function as that of the AC/DC converter 102. Switching circuits MB1 to MB4 are power MOSFETs constituting an H bridge having the same function as that of the AC/DC converter 201. Switching circuits MD1 to MD4 are power MOSFETs constituting an H bridge having the same function as that of the DC/AC converter 402. Diodes D1 and D2 are diodes configured in the first rectifier 301. Diodes D4 and D5 are diodes configured in the second rectifier 401. A step-down chopper circuit including a choke coil 302A, a switching circuit MC1, and a diode D3 corresponds to the output adjuster 302.

As a difference from FIG. 1, the commercial alternating current power source 106 is replaced with a common mode choke coil 106a, a commercial alternating current 108, a converter 107, and an alternating current load 109 for noise countermeasures. Choke coils 206, 305, 407, and 408 are newly added for current smoothing.

Triacs (hereinafter, Trac) 1 to 3 are used as devices that turn on/off an alternating current in both positive and negative directions, but the intentions of use are different from one another. Trac1 turns off the DC/AC converter 101 and the AC/DC converter 102 and separates the circuit from the isolation transformer 100. Trac2 is turned on when it is desired to add Cr2 in parallel to the resonance capacitor Cr2, and is turned off otherwise. Trac3 turns off the switching circuits MD1 to MD4 (DC/AC converter 402) and separates the circuits from the isolation transformer 100.

The commercial alternating current 108 for household has one end of a three-phase alternating current in delta connection grounded, and supplies a line-to-line voltage with delta to the switching circuits MA5 to MA8 (AC/DC converter 102). The converter 107 converts three wires including the ground wire into two wires. The alternating current load 109 causes the AC/DC converter 102 and the DC/AC converter 101 to bi-directionally operate the power obtained from the high-voltage battery 205 via the isolation transformer 100, converts the power into an alternating current output voltage, and supplies the alternating current output voltage.

Loads 406A and 406B are power sources isolated by the isolation transformer 100, and have different values of voltage amplitudes. Assuming that alternating current output obtained by bi-directionally operating the AC/DC converter 102 and the DC/AC converter 101 in FIG. 1 is AC200V and the second alternating current output controlled by the DC/AC converter 402 is AC100V, the two alternating currents are in a state of being isolated from each other, and therefore, for example, in a case where power is supplied from an electric vehicle at the time of disaster, a use method in which an electric heavy machine is operated with the first voltage effective value and a home appliance is operated with the second voltage effective value is possible.

Figure 4:
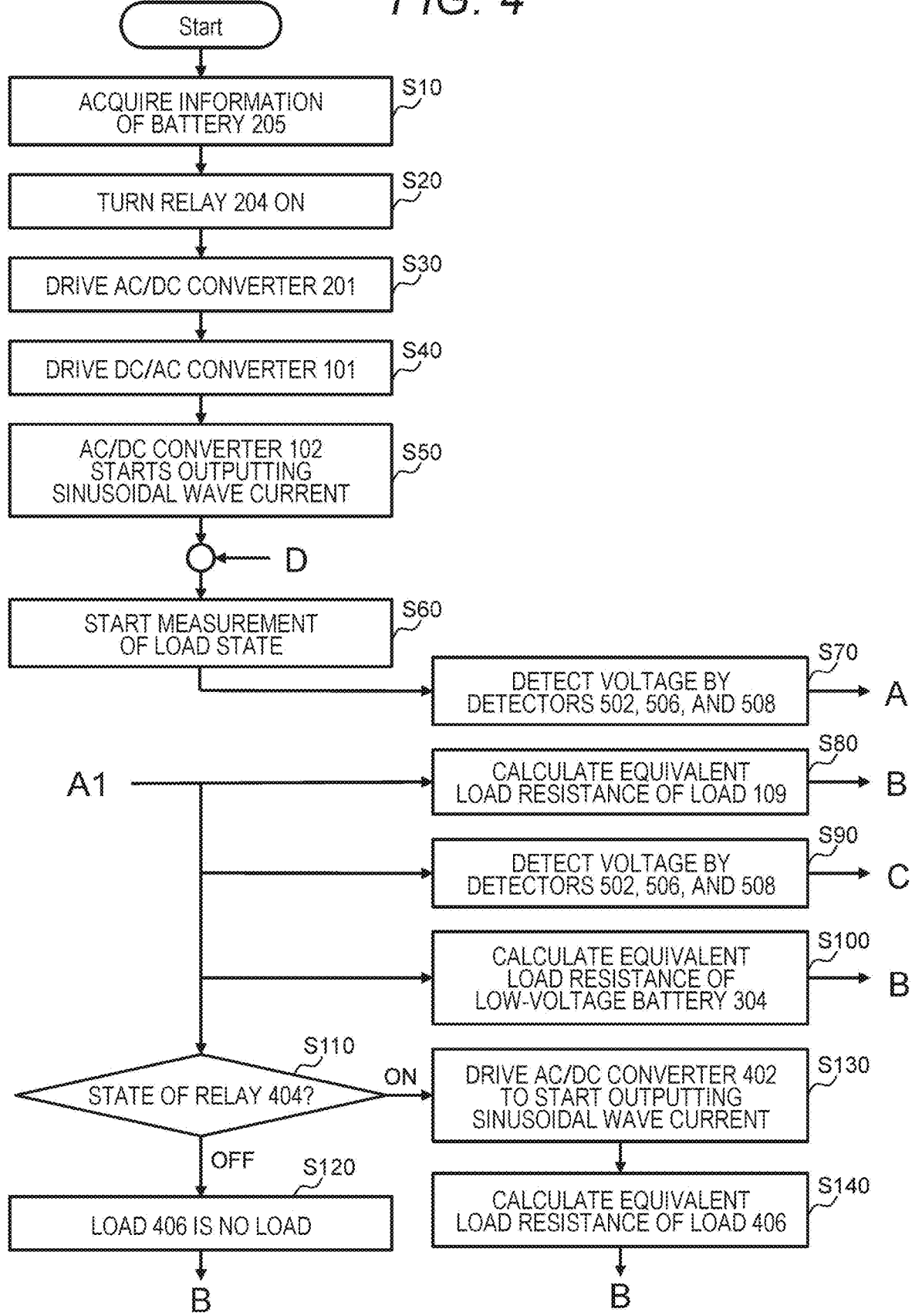
FIG. 4 is a flowchart of a control circuit.
Figure 5:
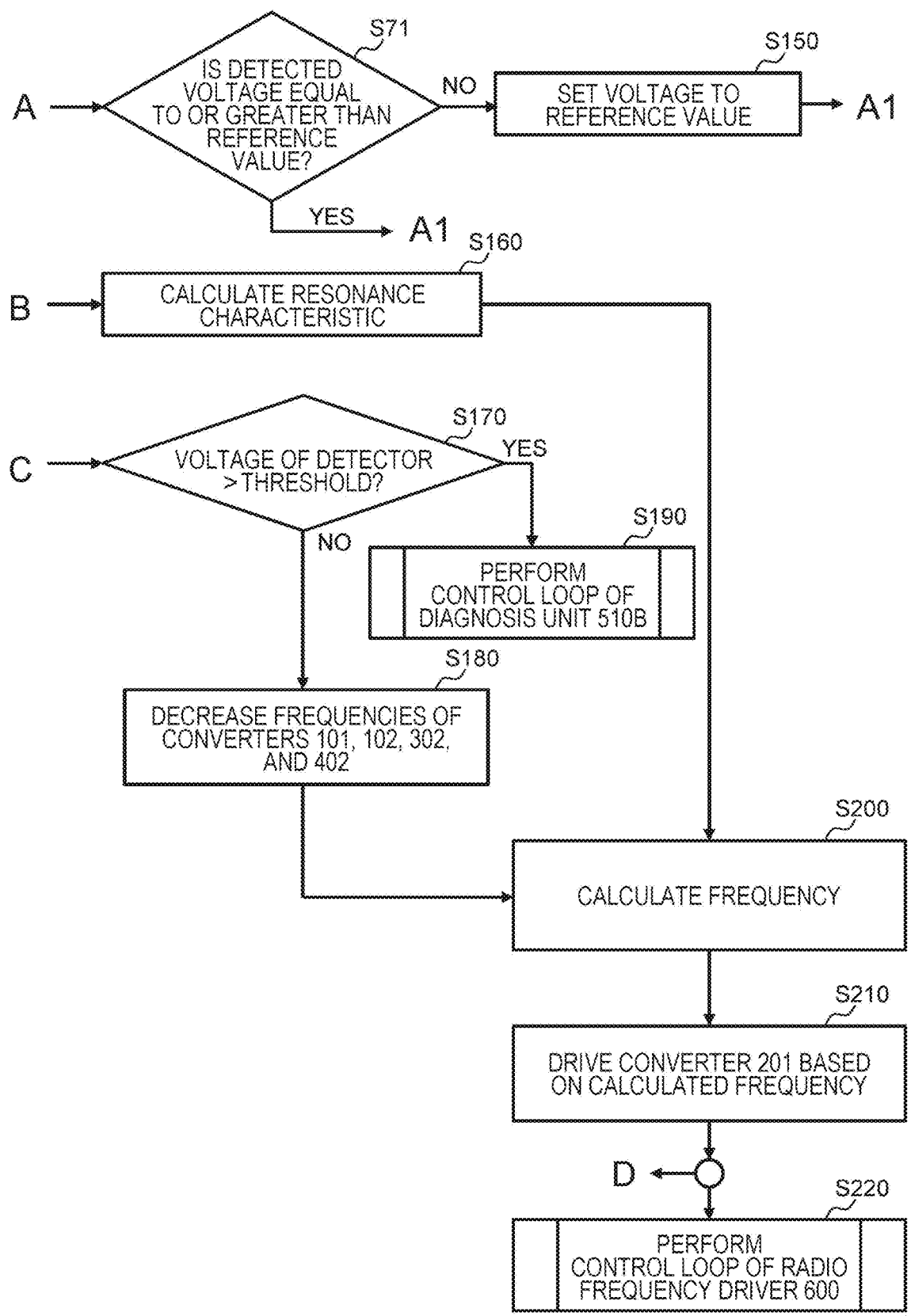
FIG. 5 is a flowchart of a control circuit.

(FIGS. 4 and 5)

A control flow of the control circuit unit 500 will be described. Note that a calculation expression and the like used in the control circuit unit 500 can be handled using a known calculation method, and thus description will be omitted. In step S10, the control circuit unit 500 acquires information on the high-voltage battery 205 and confirms soundness of the battery state. This confirmation of the battery state is performed by a control device battery management system (BMS) of the high-voltage battery not illustrated in FIG. 1. After the soundness is confirmed in step S10, the relay 204 is turned on in step S20, thereby bringing into a circuit state where the high-voltage battery 205 is ready to be charged/discharged. In step S30, the AC/DC converter 201 is driven under the condition of the highest frequency by the gate signal output from the Soft-Switching compensator 607. This drive is a soft start in which the frequency is gradually decreased by Soft-Switching, thereby suppressing an inrush current.

In step S40, the DC/AC converter 101 is operated with synchronous rectification driven under the condition of the same frequency as the gate signal of the AC/DC converter 201. In step S50, the AC/DC converter 102 narrows the on of the PWM under a small output condition for measurement and starts outputting a sinusoidal wave current. (Equivalent to process of step S30). Measurement of the load state is started in step S60, and the loads to be measured are the alternating current load 109 of the primary side switching circuit, the load of the low voltage DC (load not illustrated connected to the low-voltage battery 304), and the alternating current load 406 of the quaternary side switching circuit.

In step S70, the voltages measured by the detectors 502, 506, and 508 are detected. Subsequently, in step S71, it is confirmed whether each detection voltage is equal to or greater than a predetermined reference value. If it is equal to or greater than the reference value, the process proceeds to the parallel flow of steps S80 to S110, and otherwise the switching circuit does not operate. Therefore, in step S150, the frequencies of the AC/DC converter and the DC/AC converter on the power transmission side monitored by the detectors 502, 506, and 508 are lowered, and the output from the high-voltage battery 205 is increased, whereby the voltage has the reference value. After the voltage has the reference value, the process proceeds to the parallel flow of steps S80 to S110.

In step S80, an equivalent load resistance of the alternating current load 109 of the primary side switching circuit is calculated. In step S90, an equivalent load resistance of the low-voltage battery 304 of the tertiary side circuit is calculated. For the alternating current load 406 of the quaternary side circuit, the state of a switch 404 or a switch of the triac Trac3 is determined in step S110, it is determined to be is no load in step S120 if the switch 404 is off, the AC/DC converter 402 is PWM-driven under the condition of rated output in step S130 if the switch 404 is on, output of a sinusoidal wave current is started, and the equivalent load resistance of the alternating current load 406 is calculated in step S140. After step S80, step S100, step S120, and step S140, a resonance characteristic is calculated in step S160, and the frequency at which the power is supplied in accordance with the load sum of the alternating current load 109, the low-voltage battery 304, and the alternating current load 406 is calculated in step S200. Note that the relationship between the frequency and the power may be mapped with the resonance characteristic as a parameter in advance and used.

Figure 8:
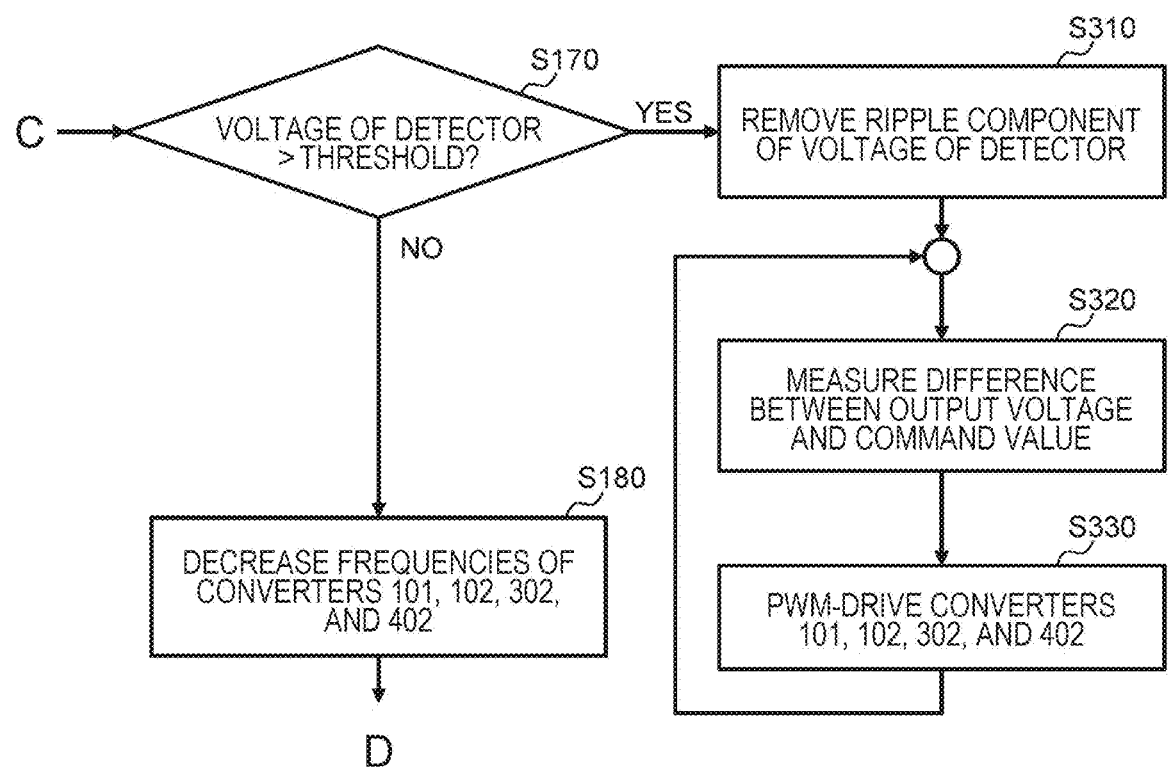
FIG. 8 is a flowchart of a voltage output circuit unit.

In step S90, the voltages of the detectors 502, 506, and 508 are detected again, and it is confirmed in step S170 whether the voltage of each of the detectors is higher than a predetermined threshold. If it is above the threshold, a control loop of the diagnosis unit 510B described later with reference to FIG. 8 is performed in step S190. If the voltage is not higher than the threshold, the frequencies of the converters 101, 102, 302, and 402 are lowered (output is increased in accordance with the resonance characteristic) to affect the frequency calculation in step S200.

In step S210, the AC/DC converter 201 on the power transmission side is driven based on the frequency calculated in step S200. In this manner, load variation of the second power output circuit, which has not been able to cope with conventionally, is allowed greatly, it is possible to periodically detect the load on the power reception side and update the resonance characteristic in accordance with the detected load. By performing control by changing the excitation frequency of the isolation transformer 100 and performing power adjustment, even if one isolation transformer 100 is shared by a plurality of power output circuits for inexpensive price and downsizing while ensuring proper power, the efficiency of the power conversion device 1 can be enhanced and proper power can be supplied.

Upon completion of step S210, load state measurement in step S60 is repeated. In step S220, a control loop of the radio frequency driver 600 illustrated in FIG. 7 described later is performed.

Figure 7:
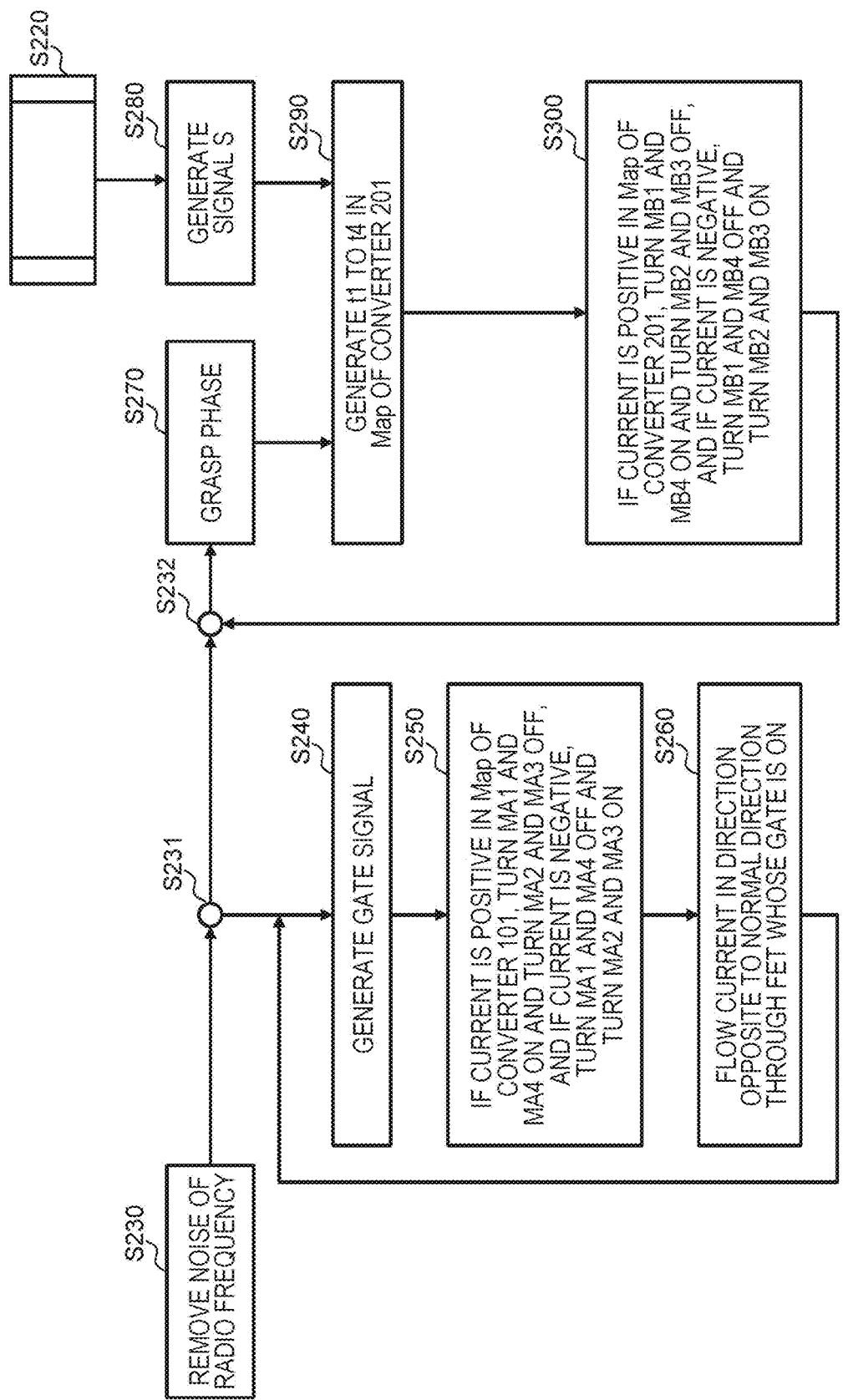
FIG. 7 is a flowchart of a radio frequency driver.

(FIGS. 6 and 7)

FIG. 6(a) illustrates the gate pulse timing of the AC/DC converter 201, and FIG. 6(b) illustrates the gate pulse timing of the DC/AC converter 101. The flowchart of FIG. 7 will be described with the AC/DC converter 201 as the power transmission side, and the DC/AC converter 101 as the power reception side, with reference to FIGS. 6(a) and 6(b).

The radio frequency driver 600 removes noise from a radio frequency current Hf-I mainly by a noise filter or the like in step S230. Upon completion of step S230, the flow branches in step S231, one of which proceeds to step S240 and the other to step S270.

S270 to S300, which are the flow on the power transmission side, will be described. In step S270, a phase in which the polarity of the current is switched is grasped from the polarity of the current Hf-I detected by the AC/DC converter 201. The phase to be grasped is, for example, phases 180° and 360°.

As the parallel flow of step S270, in step S280 a drive signal S for driving the AC/DC converter 201 is generated at the frequency commanded in steps S200 and S210 (FIG. 5).

In step S290, a period from t1 to t4 is generated in the gate pulse timing of the AC/DC converter 201 in FIG. 7(a) for the drive signal S. In FIG. 7(a), it is at point P and point N where the polarity of a current 10 is switched, the timing at which a switching circuit MB2/MB3 pulse 201b of the H bridge constituting the AC/DC converter 201 illustrated in FIG. 4 is switched from on to off is earlier by period t1 than point P, and the timing at which a switching circuit MB1/MB4 pulse 201a is switched from off to on is period t2 immediately before point P. When the device is switched in such a phase relationship, soft switching with a small loss can be executed.

Similarly, the timing at which the switching circuit MB1/MB4 pulse 201a of the H bridge constituting the AC/DC converter 201 regarding the point N is switched from on to off is earlier by period t3 than point P, and the timing at which the switching circuit MB2/MB3 pulse 201b is switched from off to on is period t4 immediately before point N. This achieves soft switching with a small loss. Upon completion of step S290, the process proceeds to step S300.

In step S300, a gate signal in which the phase timings t1 to t4 are performed is generated for the signal S, and the AC/DC converter 201 and the switching circuits MB1 to MB4 are driven by this signal.

Subsequently, steps S240 to S260, which are flows on the power reception side, will be described. The radio frequency current from which the noise is removed in step S230 generates, through step S231, a gate signal of an H bridge field effect transistor (FET) in accordance with the polarity of the current Hf-I in step S240.

As described in FIG. 6(b), in step S250, when the current 10 is positive, a switching circuit MA1/MA4 pulse 101a is turned on, and a switching circuit MA2/MA3 pulse 101b is turned off. On the other hand, when the current 10 is negative, a signal in which the switching circuit MA1/MA4 pulse is off and the switching circuit MA2/MA3 pulse is on is given. Upon completion of step S250, the process proceeds to step S260.

In step S260, the FET with the gate on conducts a current in an opposite direction to the normal direction in place of a built-in diode. In this reverse conduction state, normally, a current flows from a drain terminal to a source terminal of the FET, but when the resistance of the FET is small, a current in the reverse direction also flows. The above behaviors of the power transmission side and the power reception side are repeated at the frequencies determined in steps S200 and S210. Upon completion of step S260, the process returns to step S240 and repeats the flow.

(FIG. 8)

The flow in step S190 described with reference to FIG. 5 will be described in steps S310 to S330. In step S310, when the voltage of the detector 506 is larger than the threshold in step S170, the ripple component of the voltage of the detector 506 is removed. Upon completion of step S310, the process proceeds to step S320.

In step S320, a difference between an output voltage (+ side terminal voltage) and a command value (voltage specification value of the low-voltage battery 304) is measured in the tertiary side circuit. Upon completion of step S320, the process proceeds to step S330.

In step S330, the switching circuit MC1 is PWM-driven so as to compensate the difference measured in step S320 to 0. When the switching circuit MC1 is on, a current is conducted through a path from the switching circuit MC1 to the inductor 302A and from the inductor 302A to the low-voltage battery 304 with the capacitor 306 as a voltage source, and the low-voltage battery 304 is applied with a voltage of the capacitor 306 and a difference between of the low-voltage battery 304. When the switching circuit MC1 is turned off, the current flows back through a path from the inductor 302A to the low-voltage battery 304 and from the low-voltage battery 304 to the diode D3. The longer the on period of the switching circuit MC1 is, the more the output voltage increases. Upon completion of step S330, the process returns to step S320 and repeats the flow.

Use of the power conversion device 1 including the control circuit unit 500 having the control flow as described above enables output to loads having different voltages. Therefore, for example, at the time of disaster response, it is possible to simultaneously supply power to and operate each of devices having different voltage effective values such as an electric heavy machine and a home appliance in a state of being isolated from each other.

In the present invention, the primary side switching circuit to the quaternary side circuit share the isolation transformer 100, but the present invention can be applied to a case where a load change is large even when the number of switching circuits to be connected is small, for example.

Note that for example, the remaining capacity of the battery may be graspable by detecting the load of the second power output circuit.

According to one embodiment of the present invention described above, the following operational effects are achieved.

(1) The power conversion device 1 includes a DC/DC converter and the control circuit unit 500 that controls the DC/DC converter. The DC/DC converter includes a first power output circuit that converts first direct current power into first alternating current power, the isolation transformer 100 that converts the first alternating current power into second alternating current power, and one or a plurality of second power output circuits, each of which converts the second alternating current power into second direct current power. The control circuit unit 500 includes the resonance characteristic calculator 510A that calculates a resonance characteristic of the second power output circuits based on a load for each of the second power output circuits to output the second direct current power, and determines a drive frequency of the first power output circuit based on an output request value of the second power output circuit and the resonance characteristic that is calculated. This can provide a power conversion device 1 that achieves high efficiency while ensuring proper power supply to a plurality of power sources.

(2) The DC/DC converter includes a primary side switching circuit connected between the AC/DC converter 102 and the isolation transformer 100, and a secondary side switching circuit connected between the first direct current battery 205 and the isolation transformer 100. One of the primary side switching circuit and the secondary side switching circuit is used as the first power output circuit, and an other of the first power output circuit and the secondary side switching circuit is used as the second power output circuit. This enables the power conversion device 1 having a function as a bi-directional charger to achieve high efficiency while ensuring proper power supply to a plurality of power sources.

(3) The DC/DC converter includes the tertiary side circuit connected between the second direct current battery 304 lower in voltage than the first direct current battery 205 and the isolation transformer 100, and the quaternary side circuit connected between the DC/AC converter 402 and the isolation transformer 100. At least one of the tertiary side circuit and the quaternary side circuit is used for the second power output circuit. Thus ensures proper power supply to a plurality of power sources having different voltages.

(4) The primary side switching circuit is twice or more larger in rated output power than the quaternary side circuit. This enables a response to a case of simultaneously supplying power to and operating each of devices having different voltage effective values such as an electric heavy machine and a home appliance, for example, in a state of being isolated from each other.

(5) When the primary side switching circuit is used as the second power output circuit, the AC/DC converter 102 outputs alternating current power having a first voltage effective value based on the second direct current power output from the primary side switching circuit, and the DC/AC converter 402 outputs alternating current power having a second voltage effective value different from the first voltage effective value based on the second direct current power output from the quaternary side circuit. This enables a response to a case of simultaneously supplying power to and operating each of devices having different voltage effective values.

Note that the present invention is not limited to the above embodiment, and various modifications and other configurations can be combined without departing from the gist of the present invention. The present invention is not limited to one including all the configurations described in the above embodiment, and includes one in which a part of the configuration is deleted.

REFERENCE SIGNS LIST 1 power conversion device
10 current
100 isolation transformer
101 DC/AC converter (primary side switching circuit)
102 AC/DC converter (primary side switching circuit)
103 capacitor (primary side switching circuit)
104 radio frequency current detector (primary side switching circuit)
105 choke coil (primary side switching circuit)
106 commercial alternating current power source
106a common mode choke coil
107 converter
108 commercial alternating current
109 alternating current load
201 AC/DC converter (secondary side switching circuit)
202 radio frequency current detector (secondary side switching circuit)
203 voltage smoothing capacitor (secondary side switching circuit)
204 switch (secondary side switching circuit)
205 high-voltage battery (secondary side switching circuit)
206 choke coil (secondary side switching circuit)
301 first rectifier
302 output adjuster
302A inductor
303 capacitor
304 low-voltage battery
401 second rectifier
402 DC/AC converter (quaternary side circuit)
403 capacitor
404 switch (quaternary side circuit)
405 in-vehicle power socket
406 alternating current load
406A, 406B alternating current load
407 choke coil
408 choke coil
500 control circuit unit
510A calculation update unit
510B diagnosis unit
511 signal isolation 512 calculator
513 resonance characteristic calculation/update unit
514 drive frequency determination unit
515 voltage diagnosis unit
516 output increase/decrease unit
517 filter unit
519 voltage output circuit unit
600 radio frequency driver
601 drive frequency command unit
603 current period determination unit
604 drive signal generation unit
605 phase synchronizer
607 Soft-Switching compensator

The invention claimed is:

1. A power conversion device, comprising:
a DC/DC converter; and
a control circuit unit that controls the DC/DC converter, wherein
the DC/DC converter includes
a first power output circuit that converts first direct current power into first alternating current power,
an isolation transformer that converts the first alternating current power into second alternating current power, and
one or a plurality of second power output circuits, each of which converts the second alternating current power into second direct current power, and
the control circuit unit includes a resonance characteristic calculator that calculates a resonance characteristic of the second power output circuits based on a load for each of the second power output circuits to output the second direct current power, and determines a drive frequency of the first power output circuit based on an output request value of the second power output circuit and the resonance characteristic that is calculated.

2. The power conversion device according to claim 1, wherein
the DC/DC converter includes a primary side switching circuit connected between the AC/DC converter and the isolation transformer, and a secondary side switching circuit connected between the first direct current battery and the isolation transformer, and
one of the primary side switching circuit and the secondary side switching circuit is used as the first power output circuit, and another of the first power output circuit and the secondary side switching circuit is used as the second power output circuit.

3. The power conversion device according to claim 2, wherein
the DC/DC converter includes a tertiary side circuit connected between a second direct current battery lower in voltage than the first direct current battery and the isolation transformer, and a quaternary side circuit connected between the DC/AC converter and the isolation transformer, and
at least one of the tertiary side circuit and the quaternary side circuit is used for the second power output circuit.

4. The power conversion device according to claim 3, wherein the primary side switching circuit is twice or more in rated output power than the quaternary side circuit.

5. The power conversion device according to claim 3, wherein
when the primary side switching circuit is used as the second power output circuit, the AC/DC converter outputs alternating current power having a first voltage effective value based on the second direct current power output from the primary side switching circuit, and
the DC/AC converter outputs alternating current power having a second voltage effective value different from the first voltage effective value based on the second direct current power output from the quaternary side circuit.

* * * * *